US012694388B2

(12) United States Patent
Kurata

(10) Patent No.: US 12,694,388 B2
(45) Date of Patent: Jul. 28, 2026

(54) COMMODITY REGISTRATION TERMINAL AND COMMODITY REGISTRATION METHOD

(71) Applicant: Toshiba Tec Kabushiki Kaisha, Tokyo (JP)

(72) Inventor: Masachika Kurata, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 16 days.

(21) Appl. No.: 18/741,073

(22) Filed: Jun. 12, 2024

(65) Prior Publication Data

US 2025/0131401 A1     Apr. 24, 2025

(30) Foreign Application Priority Data

Oct. 19, 2023     (JP) ................................ 2023-180303

(51) Int. Cl.
*G06Q 20/20*          (2012.01)
*G06V 10/70*          (2022.01)
(52) U.S. Cl.
CPC ......... *G06Q 20/208* (2013.01); *G06Q 20/201* (2013.01); *G06V 10/70* (2022.01)
(58) Field of Classification Search
CPC ..... G06Q 20/208; G06Q 20/201; G06V 10/70
See application file for complete search history.

(56) References Cited

U.S. PATENT DOCUMENTS

2014/0279294 A1*  9/2014  Field-Darragh ......... H04B 5/77
                                                            705/28
2018/0218351 A1*  8/2018  Chaubard ............ G07G 1/0081

FOREIGN PATENT DOCUMENTS

JP          2021-087578 A        6/2021
JP          2022102144 A         7/2022

OTHER PUBLICATIONS

"Oracle® Retail Xstore Point of Service Self Checkout User Guide" 2023, available at https://docs.oracle.com/en/industries/retail/retail-xstore-point-of-service/22.0/rpxsc/F73549_03.pdf (Year: 2023).*
Notice of Reasons for Refusal (First Office Action) dated Mar. 3, 2026 mailed in counterpart Japanese Patent Application No. 2023-180303, with English machine translation, 6 pages.

* cited by examiner

*Primary Examiner* — Allen C Chein
(74) *Attorney, Agent, or Firm* — Kim & Stewart LLP

(57)                    ABSTRACT

In accordance with an embodiment, a commodity registration terminal detects an object on the basis of an image captured by an imaging device. The commodity registration terminal determines a commodity on the basis of the image including the detected object. The commodity registration terminal outputs a notice indicating cancellation of the determined commodity on the basis of an operation of a cancellation instruction made by a user.

8 Claims, 7 Drawing Sheets

| Terminal ID | | | | | 311 |
|---|---|---|---|---|---|
| Member ID | | | | | 312 |
| Commodity code | Unit price | Number of commodities | Commodity name | ⋯ | 313 |
| ⋮ | ⋯ | ⋯ | ⋯ | ⋯ | |
| Subtotal amount | | | | | 314 |

COMMODITY REGISTRATION TERMINAL AND COMMODITY REGISTRATION METHOD

CROSS-REFERENCE TO RELATED APPLICATIONS

This application is based upon and claims the benefit of priority from the prior Japanese Patent Application No. 2023-180303, filed on Oct. 19, 2023, the entire contents of which are incorporated herein by reference.

FIELD

An embodiment described here generally relates to a commodity registration terminal and a commodity registration method.

BACKGROUND

Cart point-of-sales (POS) systems in which an information terminal equipped with a touch panel, a scanner, and the like is provided to a shopping cart include cart POS systems called frictionless cart, AI cart, smart cart, or intelligent cart using artificial intelligence (AI), for example. In these cart POS systems, only the user putting a commodity in a cart enables the of type commodity put in the cart to be automatically identified and determined by the AI performing image recognition of its commodity package, such that the commodity is automatically registered.

In the cart POS systems, commodities are misrecognized and registered in some cases where there are commodities similar in appearance and where commodities cannot be correctly recognized depending on the way of putting the commodities.

DETAILED DEDOCUMENTION

Figure 1:
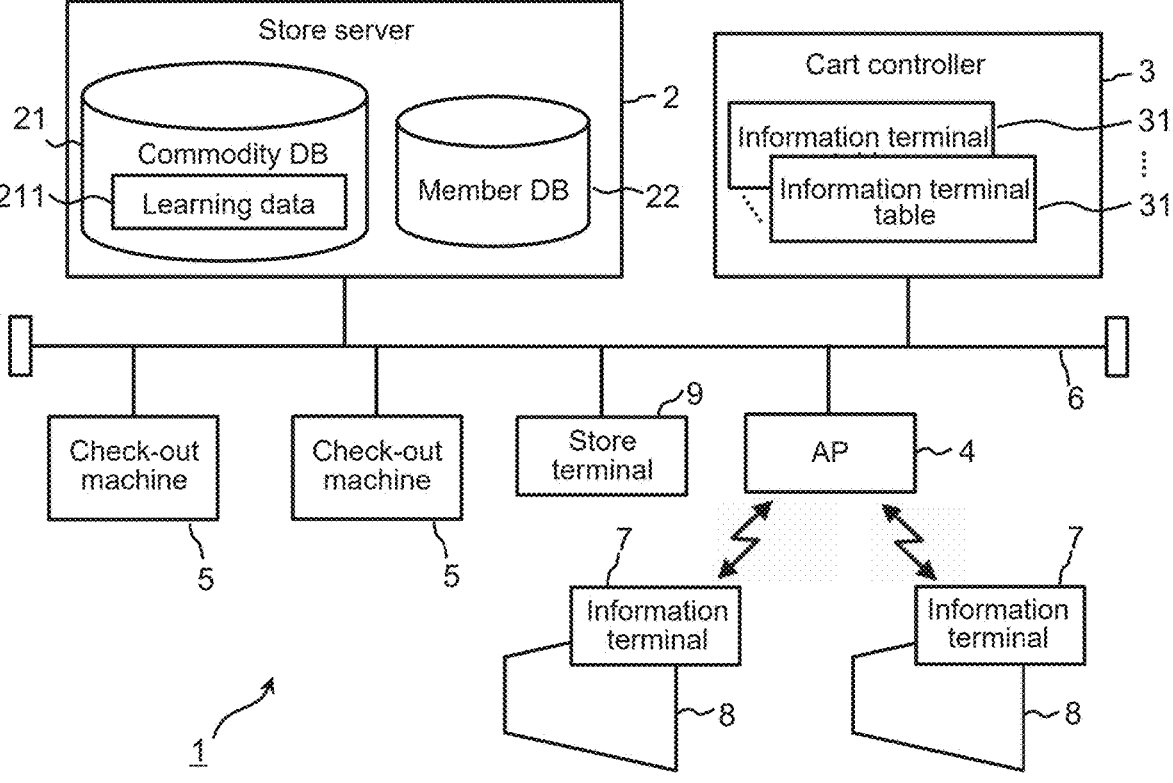
FIG. 1 is an overall configuration diagram of a cart POS system according to an embodiment.

In accordance with one embodiment, a commodity registration terminal includes an imaging device, a display device, an input device, and a processor. The imaging device captures an image of a place where a commodity is put. The display device displays information about a commodity included in the captured image and a notice to a user. The input device inputs an operation made by the user with respect to contents displayed on the display device. The processor detects an object on the basis of the image captured by the imaging device. The processor determines a commodity on the basis of the image including the detected object. The processor causes the display device to display information about the determined commodity. The processor acquires a cancellation instruction to cancel the determined commodity via the input device. In addition, the processor outputs a notice indicating the cancellation of the determined commodity on the basis of the acquired cancellation instruction.

Hereinafter, an embodiment will be described with reference to the drawings. It should be noted that in each drawing used for describing the following embodiment, scales of respective parts may be changed as appropriate. Moreover, in each drawing used for describing the following embodiment, configuration(s) may be omitted for the sake of description. In the drawings, the same reference signs denote the same or similar portions. It should be noted that the embodiment relates to a case where it is applied to a cart POS system.

FIG. 1 is an overall configuration diagram of a cart POS system 1 according to the embodiment. The cart POS system 1 includes a store server 2, a cart controller 3, an access point (shown as AP in FIG. 1) 4, check-out machines 5, and a store terminal 9. The store server 2, the cart controller 3, the access point 4, the check-out machines 5, and the store terminal 9 are connected to a network 6 such as a local area network (LAN) or a wireless LAN. The cart POS system 1 includes a plurality of information terminals 7 connected to the network 6 via the access point 4.

The information terminal 7 is a device that enables a customer who is a shopper to perform data input associated with registration of a purchased commodity by him or herself. The information terminal 7 is provided to a shopping cart 8 used when the customer shops at a store. Hereinafter, the shopping cart 8 will be simply referred to as a cart 8. The information terminals 7 are provided to the plurality of carts 8, respectively. The cart 8 is an example of a carrier that conveys the purchased commodity of the customer using the cart 8.

The information terminal 7 is provided to the cart 8. The information terminal 7 is an information processing terminal that functions as a user interface for an operation associated with registration of the purchased commodity. The information terminal 7 is provided with a wireless device. The information terminal 7 performs wireless communication with the access point 4. The access point 4 relays communication between respective devices connected to the network 6, i.e., the store server 2, the cart controller 3, the check-out machines 5, and the information terminal 7. Although only one access point 4 is shown in FIG. 1, two or more access points 4 may be employed depending on the store scale and the like.

The check-out machine 5 is a device that enables a store employee or the customer to perform check-out of the purchased commodity. The check-out machine 5 is a well-known self-POS terminal. The check-out machine 5 may be a well-known face-to-face semi-self POS terminal. The number of check-out machines 5 is not particularly limited.

The store terminal 9 is a device used by the store employee. The store terminal 9 includes an input device capable of inputting information. The store terminal 9 includes a display device capable of displaying an image. The store terminal 9 includes a communication interface that connects the store terminal 9 to another device so that they are capable of communicating with each other via the network 6. The store terminal 9 is for example a tablet terminal, a smartphone, or a personal computer (PC). Alternatively, the store terminal 9 may be a dedicated device. The store employee is an example of the user of the store terminal 9. The number of store terminals 9 is not particularly limited.

The store server 2 supports store business. For the support, the store server 2 manages a commodity database (DB) 21, a member database (DB) 22, and the like.

The commodity database 21 saves a commodity record describing commodity data for each commodity sold at the store. The commodity record includes a commodity code, a price, a commodity name, and the like. The commodity code is a commodity identification code. The sales database saves a sales record describing sales data for each item such as a commodity, a category, a time zone, a date, a week, or a month. The sales data includes the number of sold commodities, sales amount, and the like.

Moreover, in the present embodiment, the commodity database 21 stores learning data 211 learned in advance for recognizing commodities saved in the commodity database 21 by AI. The learning data 211 is a set of learning data for each commodity sold at the store and the learning data per commodity is incorporated in the learning data 211 for example in association with the commodity code. The learning data 211 allow the AI to update the learning data per commodity related to the commodity in accordance with updating of the commodity database 21 due to addition or replacement of commodities sold at the store. The learning data per commodity of each commodity may be generated by a provider of the commodity and provided to the store or may be originally generated by the store. The learning data 211 may allow the AI to learn data other than commodities, such as human hand data, in addition to the above-mentioned learning data.

The member database 22 saves a member record describing member data for each member. The member data includes a member ID, a name, a gender, a mail address, and the like. The member ID is a code such as unique membership numbers set for each member for individually identifying each member. The member owns a recording medium with the member ID recorded thereon. The recording medium is, for example, a magnetic card, a contact-type IC (integrated circuit) card, a contactless IC card, or a smartphone.

It should be noted that although it is not particularly shown in the figure, the store server 2 may further manage a member settlement database. The member settlement database saves a member settlement record describing data necessary for payment for each member. The member settlement record includes an electronic money identification code and an electronic money user ID as data necessary for payment in addition to the member ID. The cart POS system 1 according to the present embodiment limits a payment method in a case where the member does not use the check-out machine 5 to a single kind of electronic money. The electronic money identification code is an identification code of an electronic money registered in advance as one that the member identified with the member ID uses for payment. The electronic money user ID is an identification code for an electronic money center EMC to identify the user of the electronic money and is applied by the electronic money center EMC. In order to enable payment by electronic money, the member registers an electronic money identification code and an electronic money ID in advance, for example, upon member registration. It should be noted that in a case where the previous registration for the electronic money has not been performed, NULL or 0000 is stored for the electronic money identification code and the electronic money ID of the member settlement record. Moreover, in a case where the electronic money can be used in this manner, the store server 2 has a communication server function or the cart POS system 1 includes a communication server. The store server 2 or the communication server supports data communication processing performed via an external communication network such the Internet or an electronic money-dedicated network between the check-out machines 5 or the cart controller 3 and the electronic money center that supports settlement by electronic money.

Figure 2:
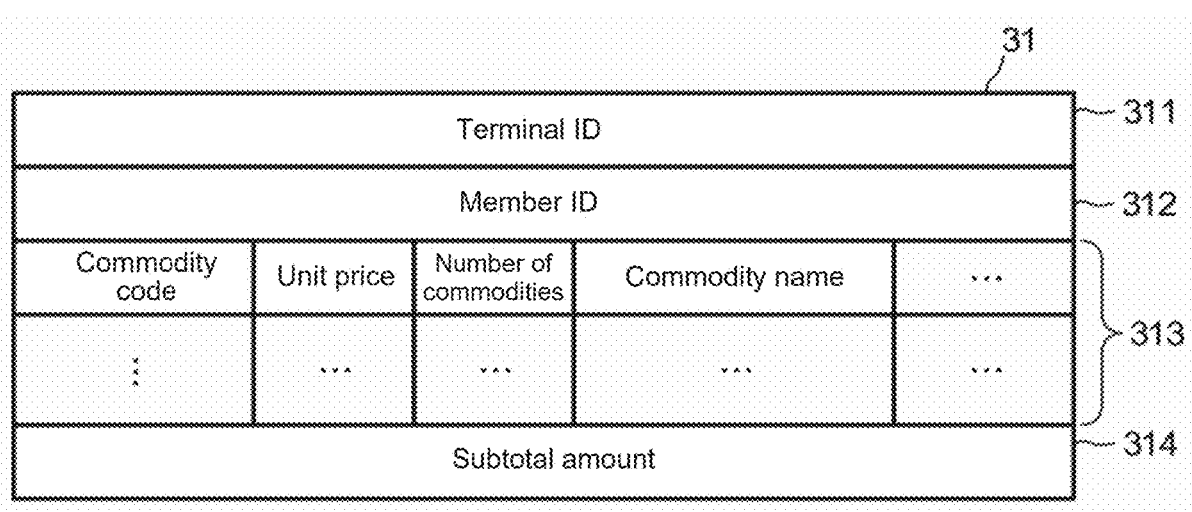
FIG. 2 is a schematic view showing a main data structure of an information terminal table of a cart controller according to the embodiment.

The cart controller 3 cooperates with the information terminal 7, thereby performing support as if the information terminal 7 functioned as the POS terminal. The cart controller 3 includes information terminal tables 31 corresponding to the information terminals 7, respectively. FIG. 2 is a schematic view showing an example of the information terminal tables 31. As shown in FIG. 2, the information terminal tables 31 includes a terminal ID area 311, a member ID area 312, one or more purchased-commodity data areas 313, and a subtotal amount area 314. The terminal ID area 311 stores a terminal ID that is a code such as terminal numbers for uniquely identifying the information terminal 7 associated with the information terminal table 31. The member ID area 312 stores the member ID. Every time the customer registers a commodity that the customer wishes to purchase by the use of the information terminal 7, the purchased-commodity data area 313 stores purchased-commodity data about the commodity. The purchased-commodity data is constituted by a commodity code of a purchased commodity purchased by the customer, a unit price, the number of sold commodities (number of items), a commodity name, a price, a tax, and the like. The subtotal amount area 314 is amount data indicating a total amount of price and tax of all purchased commodities purchased by the customer, which is calculated on the basis of the purchased-commodity data stored in the purchased-commodity data area 313. This can be updated every time the customer performs a registration operation of a commodity that the customer wishes to purchase.

Figure 3:
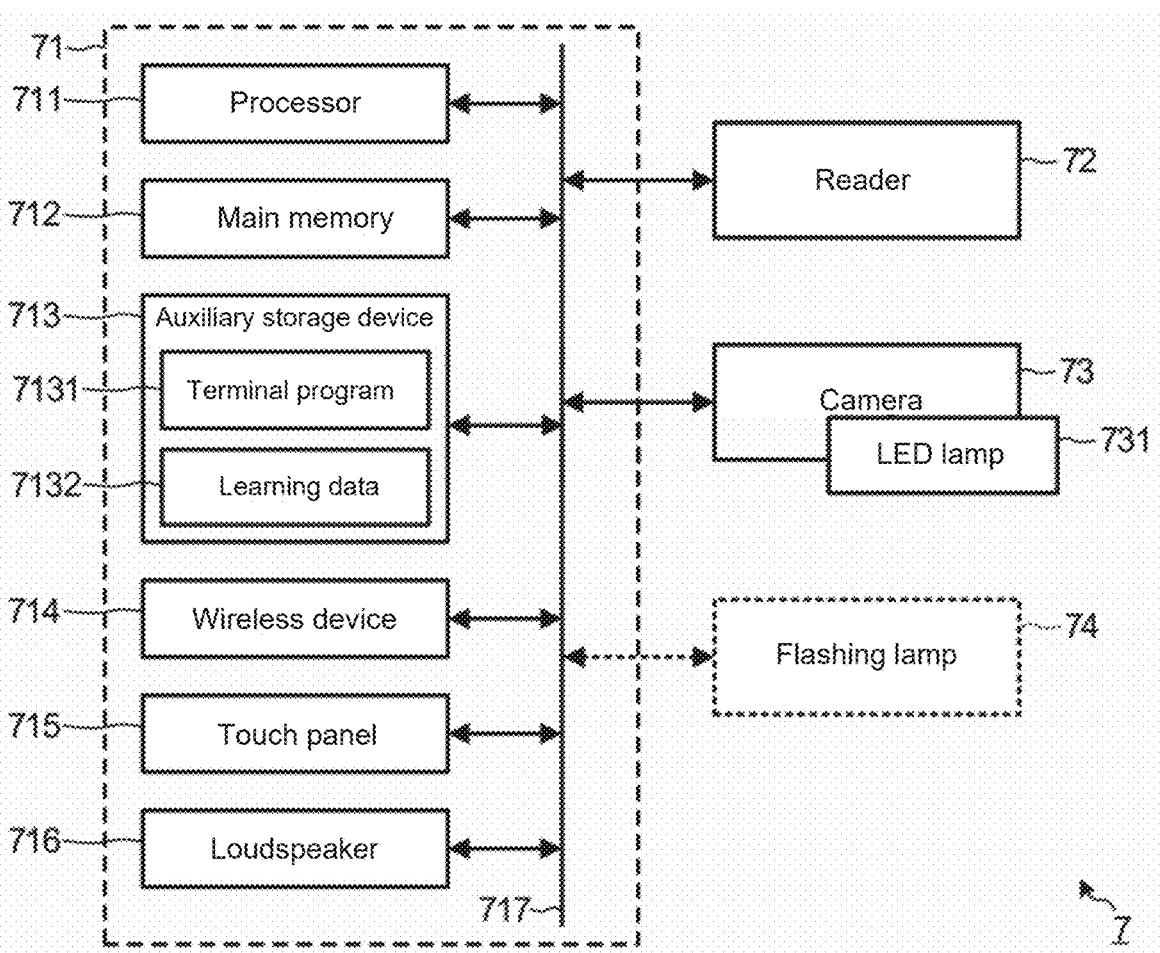
FIG. 3 is a block diagram showing a main-part circuit configuration f an information terminal according to the embodiment.
Figure 4:
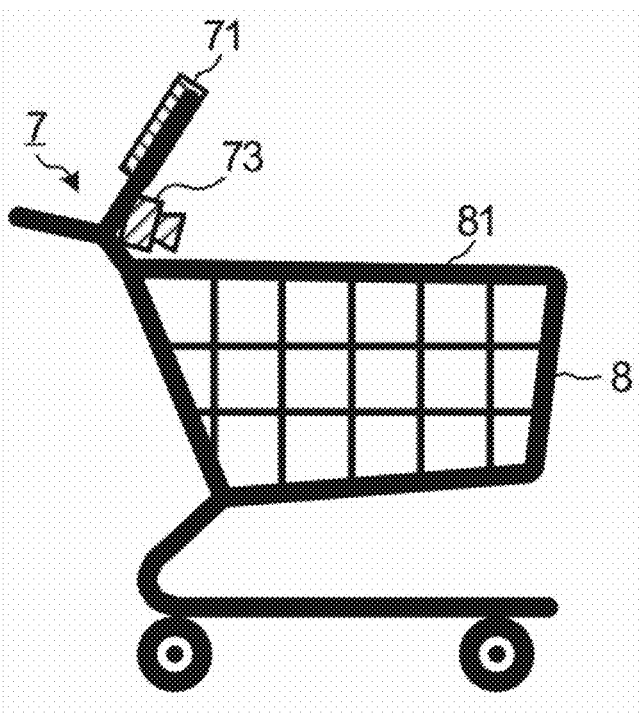
FIG. 4 is a schematic view showing an attachment position of the information terminal to a shopping cart according to the embodiment.

FIG. 3 is a block diagram showing a main-part circuit configuration of the information terminal 7. Moreover, FIG. 4 is a schematic view showing an attachment position of the information terminal 7 to the cart 8. The information terminal 7 includes an information processing apparatus 71, a reader 72, and a camera 73. The information processing apparatus 71 may be a dedicated device or may be a universal device such as a tablet computer. The information processing apparatus 71 includes a processor 711, a main memory 712, an auxiliary storage device 713, a wireless device 714, a touch panel 715, a loudspeaker 716, and a system communication channel 717. The system communication channel 717 includes an address bus, a data bus, a control signal line, and the like. The information processing apparatus 71 connects the processor 711, the main memory 712, the auxiliary storage device 713, the wireless device 714, the touch panel 715, and the loudspeaker 716 to the system communication channel 717. The reader 72 and the camera 73 are connected to the system communication channel 717 via an interface (not shown). In the information processing apparatus 71, the processor 711, the main memory 712, and the auxiliary storage device 713, and the system communication channel 717 that connects them configure a computer. The information terminal 7 is an example of a commodity registration terminal.

The processor 711 corresponds to a central portion of such a computer. The processor 711 controls the respective parts to realize various functions as the information processing apparatus 71 in accordance with an operating system or an application program. The processor 711 is, for example, a central processing unit (CPU), though not limited thereto. The processor 711 may be multi-core/multi-thread one to be capable of executing a plurality of processes in parallel. Moreover, the processor 711 can include an AI chip specialized for AI. In addition, the processor 711 may be realized in other various manner including integrated circuits such as a graphics processing unit (GPU), an application specific integrated circuit (ASIC), a field-programmable gate array (FPGA), and a digital signal processor (DSP). The processor 711 is an example of a processing circuit.

The main memory 712 corresponds to a main storage part of the above-mentioned computer. The main memory 712 includes a nonvolatile memory area and a volatile memory area. The main memory 712 stores the operating system or the application program in the nonvolatile memory area. The main memory 712 can also store data necessary for the processor 711 to execute processing for controlling the respective parts in the memory nonvolatile or volatile area. The main memory 712 uses the volatile memory area as a work area in which the processor 711 rewrites data as appropriate. The nonvolatile memory area is, for example, a read only memory (ROM). The volatile memory area is, for example, a random access memory (RAM).

The auxiliary storage device 713 corresponds to an auxiliary storage part of the above-mentioned computer. For example, an electric erasable programmable read-only memory (EEPROM (registered trademark)), a hard disc drive (HDD), or a solid state drive (SSD) can be the auxiliary storage device 713. The auxiliary storage device 713 saves data used by the processor 711 for performing various types of processing, data generated in processing of the processor 711, or the like. The auxiliary storage device 713 can also store the above-mentioned application program. In the present embodiment, a terminal program 7131 for causing the information processing apparatus 71, the reader 72, and the camera 73 to function as the information terminal 7 according to the embodiment is saved as application program. It should be noted that the terminal program 7131 may be stored in the main memory 712. Moreover, the auxiliary storage device 713 stores learning data 7132 learned for commodity recognition by AI with respect to each of commodities sold at the store, which is stored in the commodity database 21 in the store server 2. The learning data 7132 may be a copy of the learning data 211 included in the commodity database 21 in the store server 2. The timing of copying the learning data 211 as the learning data 7132 may be a particular timing, e.g., every time the information processing apparatus 71 is started or may be any timing, e.g., when it is delivered to each information processing apparatus 71 from the store server 2 at the time of updating the learning data 211.

The wireless 714 device performs wireless communication of data with the access point 4 in accordance with a wireless communication protocol.

The touch panel 715 is a device that serves as both an input device and a display device for the information terminal 7. The touch panel 715 displays an image based on image data output from the processor 711. Moreover, the touch panel 715 detects a touch position with respect to a displayed image and outputs its touch position information to the processor 711. As shown in FIG. 4, the information processing apparatus 71 is attached to the cart 8 in such position and orientation that the customer who moves while pushing the cart 8 can view the display of the touch panel 715 and make a touch operation. The touch panel 715 is an example of a display unit.

The loudspeaker 716 reproduces sound based on sound data output from the processor 711. The sound to be reproduced includes confirmation sound, alert sound, and the like.

The reader 72 reads data recorded on the recording medium and outputs the read data to the processor 711. The reader 72 is a magnetic card reader in a case where the recording medium is a magnetic card and is an IC card reader in a case where it is a contact-type IC card. In a case where it is a recording medium using radio frequency identification (RFID), such as a contactless IC card or a smartphone, the RFID reader is used as the reader 72. The attachment position of the reader 72 to the cart 8 is not particularly defined. For example, the reader 72 can be attached next to the information processing apparatus 71.

The camera 73 is provided to the cart 8 to be capable of imaging a basket-receiving portion 81 of the cart 8 from above as shown in FIG. 4. The camera 73 is for monitoring putting or returning a commodity in/from the basket-receiving portion 81 of the cart 8 or a basket placed on the basket-receiving portion 81. A light emitting diode (LED) lamp 731 for lighting can be installed in the camera 73. Operation states of the camera 73 and the LED lamp 731 can be controlled by the processor 711 via the system communication channel 717. It should be noted that in FIGS. 3 and 4, only one camera 73 is shown but two or more cameras 73 may be employed. For example, four cameras 73 may be arranged at four sides or four corners of the basket-receiving portion 81 of the cart 8. Since the brightness is sufficiently secured depending on the type of camera 73 in some cases, the LED lamp 731 may be omitted. The camera 73 is an example of an imaging device.

Moreover, the information terminal 7 may further include a flashing lamp 74 which is connected to the system communication channel 717 via an interface (not shown) and whose operation state is controlled by the processor 711 as shown as the broken line in FIG. 3. The flashing lamp 74 is a lamp for informing the customer using the cart 8 and the store employee located nearby of warning.

Figure 5:
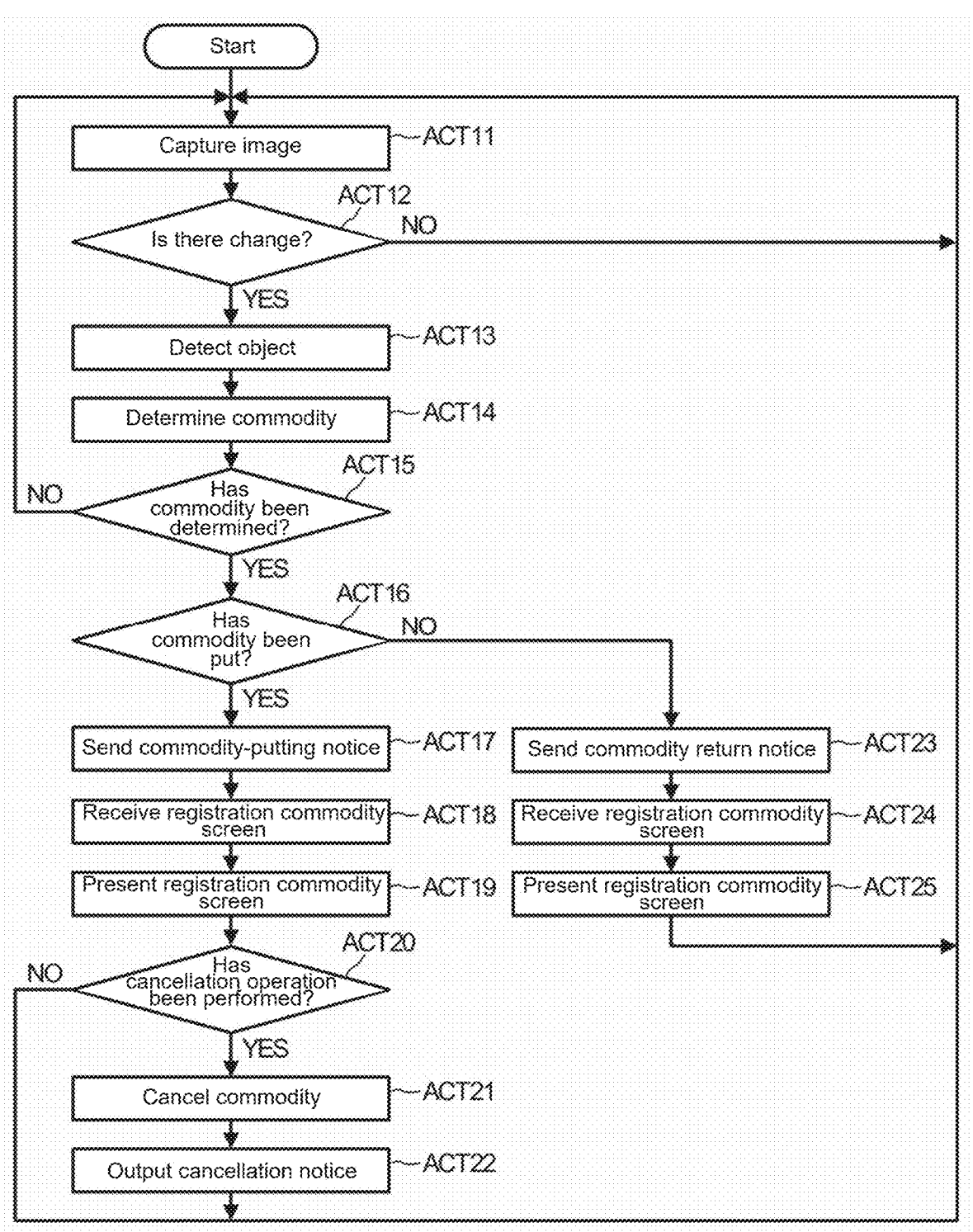
FIG. 5 is a flowchart showing main information processing executed by a processor of an information processing apparatus in the information terminal according to the embodiment in accordance with a terminal program.

FIG. 5 is a flowchart showing a procedure of main information processing executed by the processor 711 of the information processing apparatus 71 in the information terminal 7 in accordance with the terminal program 7131.

Hereinafter, a main operation of the cart POS system 1 in a case where the customer performs registration to settlement of a purchased commodity with the information terminal 7 of the cart 8 by him or herself will be described using this flowchart. It should be noted that the operation described hereinafter is an example. The procedure is not particularly limited as long as a similar result can be obtained. Here, data recorded on the recording medium has been read by the reader 72 and log-in has been already performed. That is, the member ID already read from the recording medium of the customer is stored in the member ID area 312 of the information terminal table 31 of the cart controller 3, which corresponds to the information terminal 7.

In ACT 11, the processor 711 of the information processing apparatus 71 lights up the LED lamp 731 of the camera 73 and captures an image through the camera 73. Image data of the captured image is stored in the main memory 712. It should be noted that an area for storing this image data for a plurality of frames is secured in the main memory 712 and, for storing new image data in the area, the processor 711 stores the new image data in an area secured by deleting the oldest image data. Then, the processor 711 shifts to ACT 12.

In ACT 12, the processor 711 compares object and detection position in the latest image data stored in the main memory 712 with object and detection position in the older image data, thereby determining whether or not there is a change. The processing in ACT 12 may be processing by an object detection means. The processor 711 detects an object on the basis of the fact that the commodity is put in the cart 8. Specifically, when the commodity is put in the basket-receiving portion 81 of the cart 8 or the basket placed on the basket-receiving portion 81 or the commodity is taken out from the basket-receiving portion 81 or the basket, that is, when the commodity is returned, the camera 73 images the commodity moving for the putting or returning. Therefore, when the commodity is put or returned, a difference is caused between the object and detection position in the latest image data and the object and detection position in the older image data, and therefore the processor 711 can determine that there is a change. In a case where it is determined that there is no change, the processor 711 makes a NO determination in ACT 12 and shifts to ACT 11 described above. Moreover, in a case where it is determined that there is a change, the processor 711 makes a YES determination in ACT 12 and shifts to ACT 13.

In ACT 13, the processor 711 detects the object in the image on the basis of the latest image data between which it is determined that there is a change. The processing in ACT 13 may be processing by the object detection means. Specifically, the processor 711 performs object detection on the object in the latest image, sets a rectangular area called bounding box, and detects the object in the image. The detected object and a detection position of the object in the image data are stored in the main memory 712 in association with the image data stored in the main memory 712. Then, the processor 711 shifts to ACT 14.

In ACT 14, the processor 711 determines the commodity on the basis of the image including the detected object. The processing in ACT 14 may be processing by a commodity determination means. Specifically, the processor 711 performs determination processing of determining the commodity moving in the image. The determination processing refers to determining the object included in the image as a commodity. The determination processing includes determining which commodity the object is. The determination processing includes, for example, determining the object included in the image on the basis of information capable of identifying a commodity, such as a commodity name. On the basis of the learning data 7132 stored in the auxiliary storage device 713, the processor 711 performs image recognition of the object in the bounding box, which has been detected in ACT 13 and stored in the main memory 712, and determines which commodity the object is. Then, the processor 711 shifts to ACT 15. It should be noted that the processor 711 is not limited to such processing, and determination processing of the commodity may be performed by a well-known technology.

In ACT 15, the processor 711 determines whether or not the commodity has been successfully determined. For example, when an image includes a small portion of a commodity, it is difficult to determine what the commodity is. In a case where it is determined that the commodity has not been successfully determined, the processor 711 makes a NO-determination in ACT 15 and shifts to ACT 11. In a case where it is determined that the commodity has been successfully determined, the processor 711 makes a YES determination in ACT 15 and shifts to ACT 16.

It should be noted that in a case where it is determined that the commodity has not been successfully determined, the processor 711 may display an error notice on the touch panel 715. The error notice includes, for example, a text message indicating that the commodity has not been successfully determined. The error notice can include a message, specifically, "The commodity has not been successfully determined," "Please re-put the commodity," "Please read the commodity code" for example. The processor 711 may display the error notice, superimposed on the registration commodity screen (see FIG. 6). In this case, the customer performs an operation of, for example, re-putting the commodity. The processor 711 performs processing according to the customer's operation. For example, in a case where the customer has re-put the commodity, the processor 711 shifts to ACT 11 and captures an image. In a case where the customer has performed an operation of reading the commodity code via the camera 73, a scanner (not shown), or the like, the processor 711 may determine the commodity on the basis of the commodity code.

In ACT 16, the processor 711 determines whether or not the commodity is put in the basket-receiving portion 81 of the cart 8 or the basket placed on the basket-receiving portion 81. For example, the processor 711 is capable of determining whether the commodity has been put or taken out on the basis of a movement direction of the same commodity included in the latest image and the past image. Alternatively, it is also possible to arrange a weight gauge (not shown) on the bottom surface of the basket-receiving portion 81 of the shopping cart 8 and detect putting/taking out of the commodity on the basis of whether the weight has increased or decreased. In a case where it is determined that the commodity has not been put, that is, the commodity has been taken out, the processor 711 makes a NO-determination in ACT 16 and shifts to ACT 23. Moreover, in a case where it is determined that the commodity is put, the processor 711 makes a YES determination in ACT 16 and shifts to ACT 17.

In ACT 17, the processor 711 sends a commodity-putting notice to the cart controller 3 via the access point 4 through the wireless device 714. The commodity-putting notice can include the terminal ID assigned to the information terminal 7 including the information processing apparatus 71 and the commodity code indicating the commodity determined in ACT 15 above. Then, the processor 711 shifts to ACT 18.

The cart controller 3 that has received the commodity-putting notice registers the put commodity. That is, the cart controller 3 inquires of the store server 2 the commodity information on the basis of the commodity code included in the commodity-putting notice and acquires the commodity information stored in the commodity database 21 (see FIG. 1) managed by the store server 2. Then, the cart controller 3 additionally stores the acquired commodity information in the purchased-commodity data area 313 of the information terminal table 31 (see FIG. 2) with the terminal ID included in the commodity-putting notice as new purchased-commodity data. Then, on the basis of the purchased-commodity data stored in the purchased-commodity data area 313, the cart controller 3 generates the registration commodity screen for informing of the registered commodity and sends the registration commodity screen to a sending source of the commodity-putting notice.

In ACT 18, the processor 711 receives the registration commodity screen sent from the cart controller 3 via the access point 4 through the wireless device 714. Then, the processor 711 shifts to ACT 19.

In this manner, when one commodity is put in the basket-receiving portion 81 of the cart 8 or the basket placed on the basket-receiving portion 81, the information terminal 7 determines what the commodity is by image recognition and sends the commodity-putting notice including the commodity code indicating the determined commodity to the cart controller 3, such that the commodity can be registered as the purchased commodity in the cart controller 3.

In ACT 19, the processor 711 presents the received registration commodity screen to the customer using the cart 8 through the touch panel 715. The registration commodity screen (see FIG. 6) includes a misrecognition cancellation button. In a case where the registered commodity is different from the put commodity, the misrecognition cancellation button is an operation key for inputting a cancellation instruction to cancel the registered commodity. Then, the processor 711 shifts to ACT 20 above.

In ACT 20, the processor 711 determines whether or not the user of the cart 8 has performed a cancellation operation. The processing in ACT 20 may be processing by a cancellation processing means. For example, on the basis of the user's input operation on the misrecognition cancellation button, the processor 711 determines whether or not the cancellation instruction to cancel the commodity determined in ACT 15 has been acquired. In a case where the user has performed an input operation on the misrecognition cancellation button, the processor 711 determines that the user has performed a cancellation operation. The user may select a commodity to be cancelled from a registration commodity list included in the registration commodity screen (see FIG. 6). The commodity selected as the commodity to be cancelled by the user will be referred to as the commodity to be cancelled. The user's selection operation of the commodity to be cancelled includes an operation of selecting a commodity to be cancelled from the registration commodity list by touch input or the like. In this example, the commodity determined in ACT 15 is an example of the commodity to be cancelled. The user may select the commodity determined in ACT 15 from the registration commodity list. In this case, the processor 711 makes a YES determination in ACT 20 and shifts to ACT 21. Moreover, in a case where it is determined that the user has not performed a cancellation operation, the processor 711 makes a NO-determination in ACT 20 and shifts to ACT 11.

In ACT 21, the processor 711 cancels the commodity to be cancelled. The processing in ACT 21 may be processing by the cancellation processing means. Specifically, the processor 711 sends the instruction to cancel the commodity to be cancelled to the cart controller 3 on the basis of the cancellation instruction. In this example, the commodity to be cancelled is the commodity determined in ACT 15. The cart controller 3 deletes data of the commodity to be cancelled registered as the purchased commodity in the purchased-commodity data area 313 (see FIG. 2). The cart controller 3 updates the purchased-commodity data area 313.

It should be noted that the user of the cart 8 may select and cancel the commodity displayed on the registration commodity screen (see FIG. 6) as the purchased commodity. For example, the user of the cart 8 selects the misrecognition cancellation button. The user of the cart 8 selects a commodity to be cancelled whose registration should be cancelled from the registration commodity list included in the registration commodity screen. The user's operation on the misrecognition cancellation button and the selection operation on the commodity to be cancelled may be performed in any order. The processor 711 acquires the cancellation instruction and information about a cancellation target commodity. The cancellation instruction may include the information about the cancellation target commodity. The information about the cancellation target commodity is, for example, a commodity code. The processor 711 sends the cancellation instruction and the information about the cancellation target commodity to the cart controller 3. The cart controller 3 deletes the purchased-commodity data of the commodity code included in the cancellation instruction, which has been stored in the purchased-commodity data area 313 of the information terminal table 31 (see FIG. 2) with the terminal ID included in the cancellation instruction, from the purchased-commodity data area 313. The cart controller 3 updates the purchased-commodity data area 313.

Figure 6:
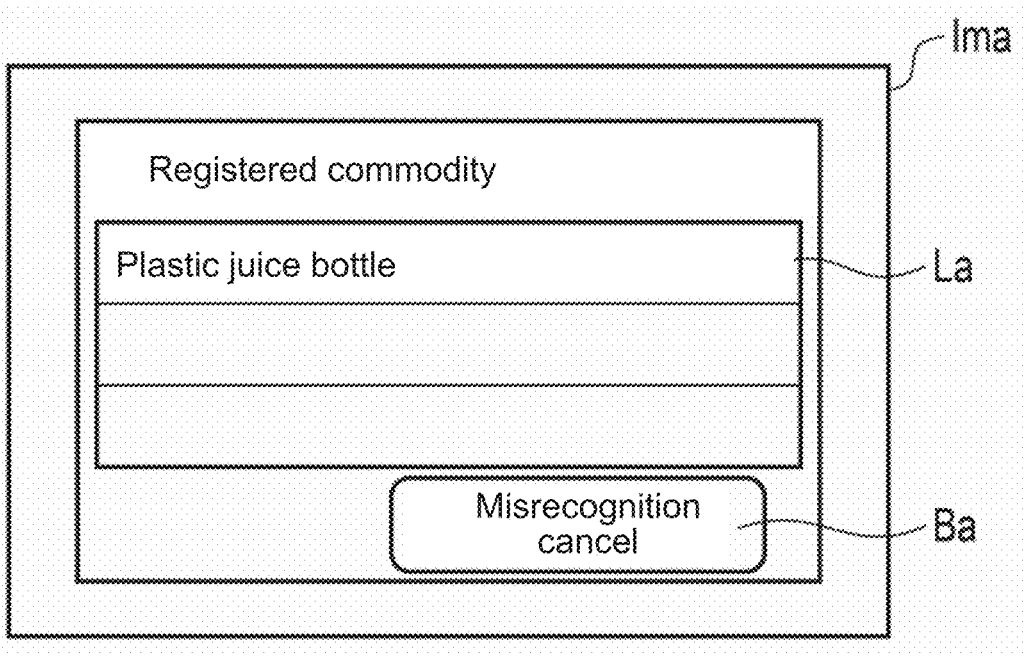
FIG. 6 is a view showing a display example of the information terminal according to the embodiment.

It should be noted that the processor 711 may display a notice indicating that the user has performed a cancellation operation on the registration commodity screen (see FIG. 6). It should be noted that the processor 711 may validate the cancellation operation on the basis of the fact that a store employee who has received a cancellation notice to be described later has performed an approval or correction operation of the cancellation operation. The approval of the cancellation operation includes an operation of inputting an approval instruction for the store employee to approve the cancellation operation via the store terminal 9 or the like. The correction operation includes an operation of inputting a correction instruction for the store employee to correct the cancellation operation via the store terminal 9 or the like. In this case, the cart controller 3 may update the purchased-commodity data area 313 on the basis of the fact that the store employee has performed an correction of the approval or operation cancellation operation.

In ACT 22, the processor 711 outputs the cancellation notice to the store terminal 9. The processing in ACT 22 may be processing by an output means. The cancellation notice is a notice indicating the cancellation of the commodity. The cancellation notice includes a message indicating that, for example, the user of the cart 8 has performed a cancellation operation of a registration commodity. The processor 711 may output to the store terminal 9 the cancellation notice on the basis of the fact that the processor 711 has acquired the cancellation instruction. The processor 711 may output the cancellation notice to the store terminal 9 on the basis of the fact that the cart controller 3 has updated the purchased-commodity data area 313. It should be noted that the processor 711 may output the cancellation notice to a portable terminal such as a smartphone or tablet used by the store employee. The processor 711 may light up the LED lamp 731 of the camera 73 as a notice indicating the cancellation of the commodity. For example, the processor 711 may change a color or a blinking pattern of the LED lamp 731 for indicating that the cancellation operation of the registration commodity has been performed. It should be noted that the processor 711 may reproduce a particular warning sound through the loudspeaker 716. Moreover, in a case where the cart 8 includes the flashing lamp 74, the flashing lamp 74 may be made to light up instead of or in addition to them.

The store employee who has received the cancellation notice determines whether or not the cancellation operation has been suitably performed. For example, the processor 711 may output the information about the cancellation target commodity and the image included in the commodity to be cancelled to the store terminal 9. The information about the cancellation target commodity is, for example, a commodity code. The image included in the commodity to be cancelled is image data using object detection of the commodity to be cancelled in ACT 12. The processor 711 may acquire image data from the main memory 712 and output the image data to the store terminal 9. On the basis of the store employee's operation, the store terminal 9 displays the image data and the image including the information about the cancellation target commodity on the display device (see FIG. 7). The store employee checks the image data against the information about the cancellation target commodity and confirms that the commodity to be cancelled is a misrecognized commodity. Accordingly, the store employee is able to determine whether or not the cancellation operation made by the user of the cart 8 is appropriate. The confirmation work by the store employee may be performed at any timing and only needs to be performed by the time the check-out processing performed by the user of the cart 8 ends. It should be noted that the processor 711 may display the image data and the image including the information about the cancellation target commodity on the touch panel 715 on the basis of the store employee's operation. Moreover, the processor 711 may output the image data and the information about the cancellation target commodity to a portable terminal such as a smartphone or tablet used by the store employee. The portable terminal may display the image data and the image including the information about the cancellation target commodity on the basis of the store employee's operation.

Moreover, in a case where it is determined that the commodity has been taken out in ACT 16 above, the processor 711 sends a commodity return notice to the cart controller 3 via the access point 4 through the wireless device 714 in ACT 23. The commodity return notice can include the terminal ID assigned to the information terminal 7 including the information processing apparatus 71 and the commodity code indicating the determined commodity in ACT 15 above. Then, the processor 711 shifts to ACT 24.

The cart controller 3 that has received the commodity return notice deletes a return commodity from registered purchased commodities. That is, the cart controller 3 deletes the purchased-commodity data of the commodity code included in the commodity return notice, which has been stored in the purchased-commodity data area 313 of the information terminal table 31 (see FIG. 2) with the terminal ID included in the commodity return notice, from the purchased-commodity data area 313. Then, on the basis of the purchased-commodity data stored in the purchased-commodity data area 313, the cart controller 3 generates the registration commodity screen for informing of the registered commodity and sends the registration commodity screen to the sending source of the commodity-putting notice.

In ACT 24, the processor 711 receives the registration commodity screen sent from the cart controller 3 via the access point 4 through the wireless device 714. Then, the processor 711 shifts to ACT 25.

In ACT 25, the processor 711 presents the received registration commodity screen to the customer using the cart 8 through the touch panel 715. Then, the processor 711 shifts to ACT 11 above.

It should be noted that the commodity determination processing (ACT 14) may be executed by the store server 2. In this case, the store server 2 performs the processing in ACT 14 to ACT 16. The processor 711 outputs to the store server 2 the latest image and the past image between which it is determined that there is a change. The store server 2 determines the commodity moving in the image. Specifically, on the basis of the learning data 211 (see FIG. 1) stored in the commodity database 21, the store server 2 performs image recognition on the object in the bounding box set to the latest image and determines which commodity the object is. The commodity determination can be realized by a well-known technology. On the basis of the commodity determination result and a determination result as to whether or not the commodity is put, the store server 2 generates the registration commodity screen and sends the registration commodity screen to a sending source of the image. In ACT 18 or ACT 24, the processor 711 receives the registration commodity screen.

In accordance with this example, the user of the cart 8 is able to cancel the misrecognized commodity in a case where the put commodity has been misrecognized by the cart POS system. The information terminal 7 is capable of deleting the misrecognized commodity from the registration commodity on the basis of the operation made by the user. For example, in a frictionless cart POS system in which commodity registration is automatically performed by the customer putting a commodity in a cart, the user is able to misrecognize the put commodity. When the user takes out the misrecognized commodity from the cart, the cart POS system recognizes the taken-out commodity again, and therefore the commodity may be correctly recognized unlike a case where the commodity is put. In such a case, the put commodity contradicts the taken-out commodity because the commodity is misrecognized when the commodity is put and the commodity is correctly recognized when the commodity is taken out, and therefore the cancellation processing cannot be suitably performed sometimes. Also in such a case, the above-mentioned function enables the information terminal 7 to cancel the misrecognized commodity by the customer's operation. Accordingly, the information terminal 7 is capable of suitably cancelling the misrecognized commodity.

Moreover, the information terminal 7 is capable of outputting a notice indicating the cancellation of the commodity to the store terminal 9 and the like on the basis of the cancellation operation of the misrecognized commodity performed by the user of the cart 8. Therefore, the store employee is able to recognize that the user's cancellation operation of the misrecognized commodity has been performed. On the basis of a notice, the store employee is capable of determining whether or not the cancellation operation of the misrecognized commodity has been suitably performed.

The registration commodity screen for performing misrecognition cancellation will be described. FIG. 6 is a view showing a display example of the information terminal 7 according to the embodiment. FIG. 6 shows a registration commodity screen Ima displayed on the touch panel 715.

The registration commodity screen Ima includes a registration commodity list La and a misrecognition cancellation button Ba. The registration commodity list La is a list including information about the registered commodity. The misrecognition cancellation button Ba is an operation key for inputting the cancellation instruction to cancel the misrecognized commodity. The user inputs the instruction to cancel the misrecognized commodity by operating the misrecognition cancellation button Ba. The processor 711 acquires the instruction to cancel the misrecognized commodity on the basis of the user's operation of the misrecognition cancellation button Ba. For example, the user selects the commodity to be cancelled from the registration commodity list La. The user inputs the misrecognition cancellation button Ba. Accordingly, the processor 711 acquires the cancellation instruction and the information about the cancellation target commodity.

The description will be given by taking a case where a commodity that the user has put in the cart 8 is a snack food as an example. The processor 711 misrecognizes that the put commodity is a plastic juice bottle. The processor 711 determines the put commodity as the "plastic juice bottle". The processor 711 displays the "plastic juice bottle" in the registration commodity list La on the registration commodity screen Ima. The user of the cart 8 determines that the commodity has been misrecognized on the basis of the fact that the put commodity is different from a commodity displayed in the registration commodity list La. The user of the cart 8 performs an operation of selecting the misrecognition cancellation button Ba by touch input or the like and inputs the instruction to cancel the misrecognized commodity. The processor 711 acquires the cancellation instruction and the information about the cancellation target commodity and performs the above-mentioned cancellation processing.

It should be noted that the selection processing of the commodity to be cancelled may be omitted. For example, in a case where there is only one registration commodity, the processor 711 may determine the registration commodity as the commodity to be cancelled. In a case of cancelling the latest registration commodity, the processor 711 may determine the latest registration commodity as the commodity to be cancelled.

In accordance with this example, in a case where the misrecognized commodity has been registered, the user of the cart 8 is able to easily cancel the misrecognized commodity by performing a selection operation of a registration-target commodity on the registration commodity screen and a selection operation on the misrecognition cancellation button.

Figure 7:
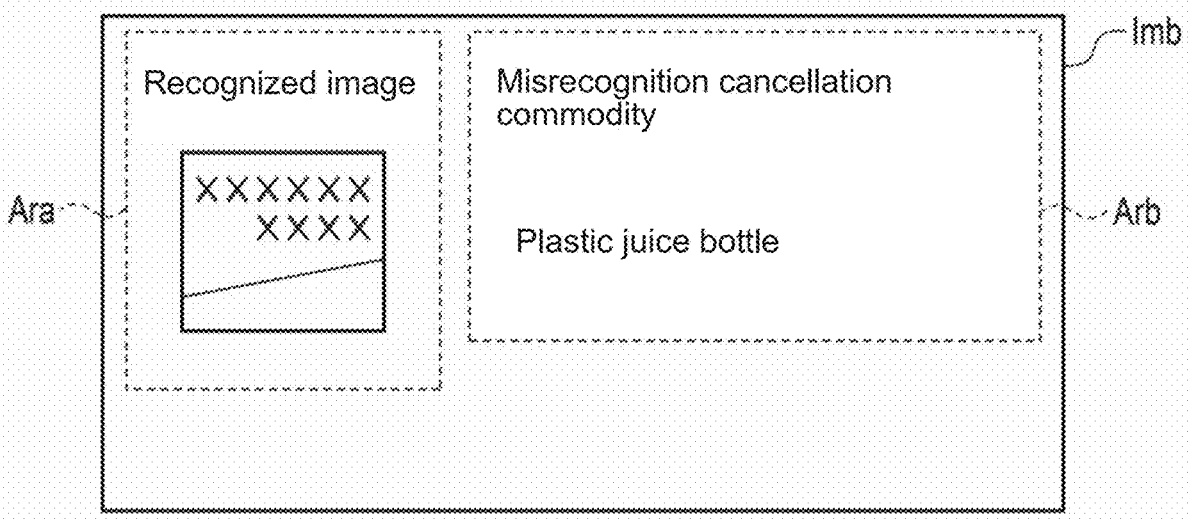
FIG. 7 is a view showing a display example of a store terminal according to the embodiment.

A screen for confirming a misrecognition-cancelling operation will be described. FIG. 7 is a view showing a display example of the store terminal 9 according to the embodiment.

FIG. 7 shows a cancellation-confirming screen Imb displayed on the display device of the store terminal 9.

The cancellation-confirming screen Imb includes a misrecognition image area Ara and a cancellation commodity display area Arb. The misrecognition image area Ara is an area for displaying the image included in the commodity to be cancelled which has been captured by the camera 73 when the commodity to be cancelled has been put. The cancellation commodity display area Arb is an area for displaying the information about the cancellation target commodity.

The description will be given taking the case of FIG. 6 as an example. In FIG. 7, the image captured when the user of the cart 8 puts the snack food is displayed in the misrecognition image area Ara as the image included in the commodity to be cancelled. As information about the cancelled commodity, the "plastic juice bottle" is displayed in the cancellation commodity display area Arb. The store employee compares the image included in the commodity to be cancelled with the information about the cancelled commodity. The store employee determines that the cancellation operation made by the user of the cart 8 is appropriate in a case where the image included in the commodity to be cancelled and the information about the cancelled commodity show different commodities. In this case, the store employee may operate the store terminal 9 and approve the user's cancellation operation. In a case where the image included in the commodity to be cancelled and the information about the cancelled commodity show the same commodity, the store employee determines that the cancellation operation made by the user of the cart 8 is inappropriate. In this case, the store employee may operate the store terminal 9 and correct the user's cancellation operation.

It should be noted that the cancellation-confirming screen Imb may be displayed on a portable terminal owned by the store employee or the touch panel 715. In a case where the cancellation-confirming screen Imb is displayed on the touch panel 715, the store employee may approve or correct the user's cancellation operation on the touch panel 715 on an operation mode or the like for the store employee.

In accordance with this example, the store employee who has received a notice indicating that the user of the cart 8 has performed a cancellation operation is able to confirm whether or not the cancellation operation is appropriate on the basis of the image included in the commodity to be cancelled and the information about the cancelled commodity. Therefore, the cart POS system is capable of supporting prevention of illegal actions using the misrecognition-cancelling operation.

Other Embodiments

In the above-mentioned embodiment, the trigger to start the object detection is a change between images, though not limited thereto. For example, at least one sensor that for example optically detects the object located in the field-of-view of the camera 73 may be arranged at any position of the cart 8 and the commodity recognition may be started in accordance with the fact that this sensor has detected the object put in or taken out from the cart 8.

Moreover, the determination as to whether the commodity has been put or taken out is not limited to the determination based on the images. For example, it is also possible to arrange a weight gauge on the bottom surface of the basket-receiving portion 81 of the shopping cart 8 and determine whether the commodity has been put or taken out on the basis of whether the weight has increased or decreased.

The commodity registration terminal may be realized by a single apparatus s like the information terminal 7 described above as an example or may be realized by a plurality of apparatuses in which the function is distributed.

The above-mentioned embodiment may be applied to a method executed by an apparatus. The above-mentioned embodiment may be applied to a program that enables a computer of the apparatus to execute each function. The above-mentioned embodiment may be applied to a recording medium for storing the program.

Each of one or more circuits that constitute the processing circuit executes one or more processes of a plurality of processes. In a case where the processing circuit is constituted by a single circuit, the single circuit executes all the plurality of processes. In a case where the processing circuit is constituted by a plurality of circuits, each of the plurality of circuits executes some of the plurality of processes. Some of the plurality of processes may be one of the plurality of processes or may be two or more of the plurality of processes. In a case where the processing circuit is constituted by a plurality of circuits, the plurality of circuits may be included in a single apparatus or may be distributed in a plurality of apparatuses.

The program may be delivered in a state stored in the apparatus according to the embodiment or may be delivered in a state not stored in the apparatus. In the latter case, the program may be delivered via the network or may be delivered in a state recorded on the recording medium. The recording medium is a non-transitory tangible medium. The recording medium is a computer-readable medium. The recording medium can take any form as long as it is a computer-readable medium capable of storing a program, such as a CD-ROM or a memory card.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity registration terminal, comprising:

an imaging device that captures an image of a place where a commodity is put;

a display device that displays information about a commodity included in the captured image and a notice to a user;

an input device that inputs an operation made by the user with respect to contents displayed on the display device;

a memory having an area for storing image data of the captured image for a plurality of frames; and a processor configured to detect an object on the basis of the image captured by the imaging device, determine a commodity on the basis of the image including the detected object, cause the display device to display information about the determined commodity, acquire a cancellation instruction to cancel the determined commodity via the input device, and output a notice indicating the cancellation of the determined commodity on the basis of the acquired cancellation instruction, wherein the processor stores the new image data in an area secured by deleting oldest image data when storing new image data in the area, compares an object and a detection position in the latest image data stored in the memory with an object and a detection position in the older image data, thereby determining whether or not there is a change between the object and the detection position in the latest image data and the object and the detection position in the older image data, detects, in a case where it is determined that there is a change between the object and the detection position in the latest image data and the object and the detection position in the older image data, the object in the image on the basis of the latest image data, and stores, in the memory, the detected object and a detection position of the object in the image data in association with the image data stored in the memory.

2. The commodity registration terminal according to claim 1, further comprising a storage device that stores learning data learned in advance for recognizing the commodity, wherein the processor performs image recognition with respect to the object stored in the memory on the basis of the learning data stored in the storage device and determines which commodity the object is.

3. The commodity registration terminal according to claim 1, wherein the processor displays a registration commodity screen on the display device, the registration commodity screen including the information about the determined commodity.

4. The commodity registration terminal according to claim 3, wherein the registration commodity screen includes a misrecognition cancellation button that inputs a cancellation instruction to cancel the determined commodity as the input device.

5. The commodity registration terminal according to claim 1, wherein the imaging device is provided to a cart, and the processor detects an object on the basis of that the commodity is put in the cart.

6. The commodity registration terminal according to claim 1, wherein the processor outputs an image including a commodity that is a cancellation target according to the cancellation instruction.

7. The commodity registration terminal according to claim 6, further comprising a wireless device that communicates with a store terminal used by a store employee, wherein the processor outputs an image including the commodity that is the cancellation target according to the cancellation instruction via the wireless device.

8. The commodity registration terminal according to claim 7, wherein the processor outputs an image including the commodity that is the cancellation target and information about the commodity that is the cancellation target.

* * * * *